(12) United States Patent
Yoshinaga et al.

(10) Patent No.: US 8,274,778 B2
(45) Date of Patent: Sep. 25, 2012

(54) CAPACITOR

(75) Inventors: Fumitaka Yoshinaga, Toyota (JP); Naoyoshi Takamatsu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 251 days.

(21) Appl. No.: 12/740,842

(22) PCT Filed: Oct. 17, 2008

(86) PCT No.: PCT/JP2008/068827
§ 371 (c)(1),
(2), (4) Date: Apr. 30, 2010

(87) PCT Pub. No.: WO2009/090783
PCT Pub. Date: Jul. 23, 2009

(65) Prior Publication Data
US 2010/0296224 A1    Nov. 25, 2010

(30) Foreign Application Priority Data
Jan. 17, 2008   (JP) ................................. 2008-007776

(51) Int. Cl.
*H01G 4/32*    (2006.01)
*H01G 4/08*    (2006.01)
(52) U.S. Cl. ..................................... 361/301.5; 361/323
(58) Field of Classification Search .................. 361/273, 361/323, 301.5
See application file for complete search history.

(56) References Cited

U.S. PATENT DOCUMENTS

| | | | | |
|---|---|---|---|---|
| 3,740,623 A | * | 6/1973 | Toro | 361/304 |
| 4,719,537 A | * | 1/1988 | Gizolme | 361/273 |
| 5,359,487 A | * | 10/1994 | Carrico et al. | 361/301.5 |
| 5,696,663 A | * | 12/1997 | Unami et al. | 361/305 |
| 5,757,607 A | * | 5/1998 | Folli | 361/273 |

FOREIGN PATENT DOCUMENTS

| | | |
|---|---|---|
| JP | U-54-45946 | 3/1979 |
| JP | A-62-189711 | 8/1987 |
| JP | U-5-11430 | 2/1993 |
| JP | A-10-326720 | 12/1998 |
| JP | A-11-317320 | 11/1999 |
| JP | A-2003-282353 | 10/2003 |
| JP | A-2004-303942 | 10/2004 |
| JP | A-2005-160058 | 6/2005 |
| JP | A-2006-269652 | 10/2006 |

OTHER PUBLICATIONS

Aug. 11, 2011 Office Action issued in Korean Patent Application No. 10-2010-7014256 (with translation).
International Search Report issued on Dec. 22, 2008 in International Application No. PCT/JP2008/068827 (with translation).
Japanese Office Action issued on Sep. 15, 2009 in Japanese Patent Application No. 007776/2008 (with translation).

* cited by examiner

*Primary Examiner* — Eric Thomas
(74) *Attorney, Agent, or Firm* — Oliff & Berridge, PLC (57) ABSTRACT

A capacitor formed by winding a multilayer film in which an insulation film, a cathode, electrode, an insulation film and an anode electrode are serially multilayered, wherein at least one of first insulation film and second insulation film is formed so that an end portion of insulation film on an inward side of the capacitor has a thickness larger than a thickness of an end portion thereof on an outward side of the capacitor.

6 Claims, 10 Drawing Sheets

CAPACITOR

TECHNICAL FIELD

The present invention relates to a capacitor.

BACKGROUND ART

There are various types of capacitors so far invented. For example, a filter element recited in Japanese Patent Laying-Open No. 2005-160058 (Patent Document 1) is provided with a coil portion cylindrically formed in its overall shape by rolling up an insulating member having a band shape, electric conductors having a band shape used for signals and provided in juxtaposition distant from each other in a width direction of the band-shape insulating member on a surface side of the band-shape insulating member, and electric conductors having a band shape used for grounding and provided on another surface side of the band-shape insulating member.

A capacitor device recited in Japanese Patent Laying-Open No. 2006-269652 (Patent Document 2) is provided with a first capacitor having a highly heat-resistant film, a second capacitor having a heat resistance lower than a heat resistance of the first capacitor, and an outer housing case for housing the first and second capacitors. The first and second capacitors are housed in the outer housing case in view of their heat resistance.

Describing the construction of a laminated capacitor recited in Japanese Patent Laying-Open No. 2003-282353 (Patent Document 3), an internal electrode for forming an electrostatic capacity, an external electrode lead-out portion and an electric wave absorbing portion are provided on each of two dielectric sheets so that two capacitor elements are formed, these two sheets of capacitor elements are attached to each other and rolled up from its edge into a cylindrical shape, and external electrodes are finally fitted to both ends of the cylindrical shape.

Patent Document 1: Japanese Patent Laying-Open No. 2005-160058
Patent Document 2: Japanese Patent Laying-Open No. 2006-269652
Patent Document 3: Japanese Patent Laying-Open No. 2003-282353

DISCLOSURE OF THE INVENTION

Problems to be Solved by the Invention

The conventional filter element, capacitor device and laminated capacitor, however, had the problem that temperature increases in the capacitor deteriorate an insulation film provided in the capacitor in such a manner that a part of the insulation film on an inward side of the capacitor deteriorates sooner than the other parts thereof on an outward side of the capacitor.

The present invention was carried out in order to solve the problem, and a main object thereof is to provide a capacitor constructed so as to prevent early deterioration of an insulation film disposed on an inward side of a capacitor.

Means for Solving the Problems

A capacitor according to the present invention is a capacitor formed by winding a multilayer film in which a first insulation film, a first electrode, a second insulation film and a second electrode are serially multilayered, wherein at least one of the first insulation film and the second insulation film is formed so that an end portion thereof on an inward side of the capacitor has a thickness larger than a thickness of an end portion thereof on an outward side of the capacitor. In the capacitor formed by winding the multilayer film in which the first insulation film, first electrode, second insulation film and second electrode are serially multilayered, preferably, the first insulation film is formed so that an end portion thereof on the inward side of the capacitor has a thickness larger than a thickness of an end portion thereof on the outward side of the capacitor, and the second insulation film is formed so that an end portion thereof on the inward side of the capacitor has a thickness larger than a thickness of an end portion thereof on the outward side of the capacitor.

Preferably, the first insulation film is formed so as to have a thickness progressively larger from the end portion of the first insulation film on the outward side of the capacitor toward the end portion thereof on the inward side of the capacitor, and the second insulation film is formed so as to have a thickness progressively larger from the end portion of the second insulation film on the outward side of the capacitor toward the end portion thereof on the inward side of the capacitor. The first insulation film preferably includes a first split insulation film disposed on the outward side of the capacitor, and a second split insulation film disposed more inward in the capacitor than the first split insulation film and formed to be thicker than the first split insulation film. The second insulation film preferably includes a third split insulation film disposed on the outward side of the capacitor, and a fourth split insulation film disposed more inward in the capacitor than the third split insulation film and formed to be thicker than the third split insulation film.

Preferably, the first insulation film is formed so as to have a thickness progressively larger from the end portion of the first insulation film on the outward side of the capacitor toward the end side thereof on the inward side of the capacitor, and the second insulation film is formed so as to have a thickness progressively larger from the end portion of the second insulation film on the outward side of the capacitor toward the end side thereof on the inward side of the capacitor.

The first insulation film preferably includes a first split insulation film disposed on the outward side of the capacitor, and a second split insulation film disposed more inward in the capacitor than the first split insulation film and formed to be thicker than the first split insulation film. The second insulation film preferably includes a third split insulation film disposed on the outward side of the capacitor, and a fourth split insulation film disposed more inward in the capacitor than the third split insulation film and formed to be thicker than the third split insulation film. The first electrode preferably includes a first split electrode formed on the first split insulation film, an end portion of the first split electrode on the inward side of the capacitor being disposed more outward in the capacitor than an end portion of the first split insulation film on the inward side of the capacitor, and a second split electrode formed on the second split insulation film, an end portion of the second split electrode on the outward side of the capacitor being disposed more inward in the capacitor than an end portion of the second split insulation film on the outward side of the capacitor. The second electrode preferably includes a third split electrode formed on the third split insulation film, an end portion of the third split electrode on the inward side of the capacitor being disposed more outward in the capacitor than an end portion of the third split insulation film on the inward side of the capacitor, and a fourth split electrode formed on the fourth split insulation film, an end portion of the fourth split electrode on the outward side of the capacitor being disposed more inward in the capacitor than an end portion of the fourth split insulation film on the outward side of the capacitor. Preferably, a material having a dielectric constant higher than dielectric constants of the first and second insulation films is added to the end portion of the first insulation film on the outward side of the capacitor and the end portion of the second insulation film on the outward side of the capacitor.

Effects of the Invention

The capacitor according to the present invention can prevent early deterioration of an insulation film provided on an inward side of the capacitor caused by temperature increases in the capacitor.

DESCRIPTION OF THE REFERENCE SIGNS

100 capacitor device, 101 outer housing case, 110 capacitor, 111, 112 electrode terminal, 114, 115 insulation film, 124 cathode electrode, 125 anode electrode, 134, 135 split cathode electrode, 136, 137 split anode electrode, 144, 145, 146, 147 split insulation film, 160 multilayer film, 161, 162 split multilayer film, 163 joint, 165 high-dielectric powder, 410 load drive apparatus

BEST MODES FOR CARRYING OUT THE INVENTION

Preferred embodiments of a capacitor according to the present invention are hereinafter described referring to FIGS. 1 to 13. Any particular number of articles and values representing quantities recited in the description of the preferred embodiments given below do not necessarily limit the scope of the present invention unless stated otherwise. All of constitutive elements recited in the description of the preferred embodiments given below are not necessarily indispensable for accomplishing the present invention unless stated otherwise. Further, it is anticipated in advance to suitably combine characteristic parts of a plurality of preferred embodiments recited below unless stated otherwise.

Embodiment 1

Figure 1:
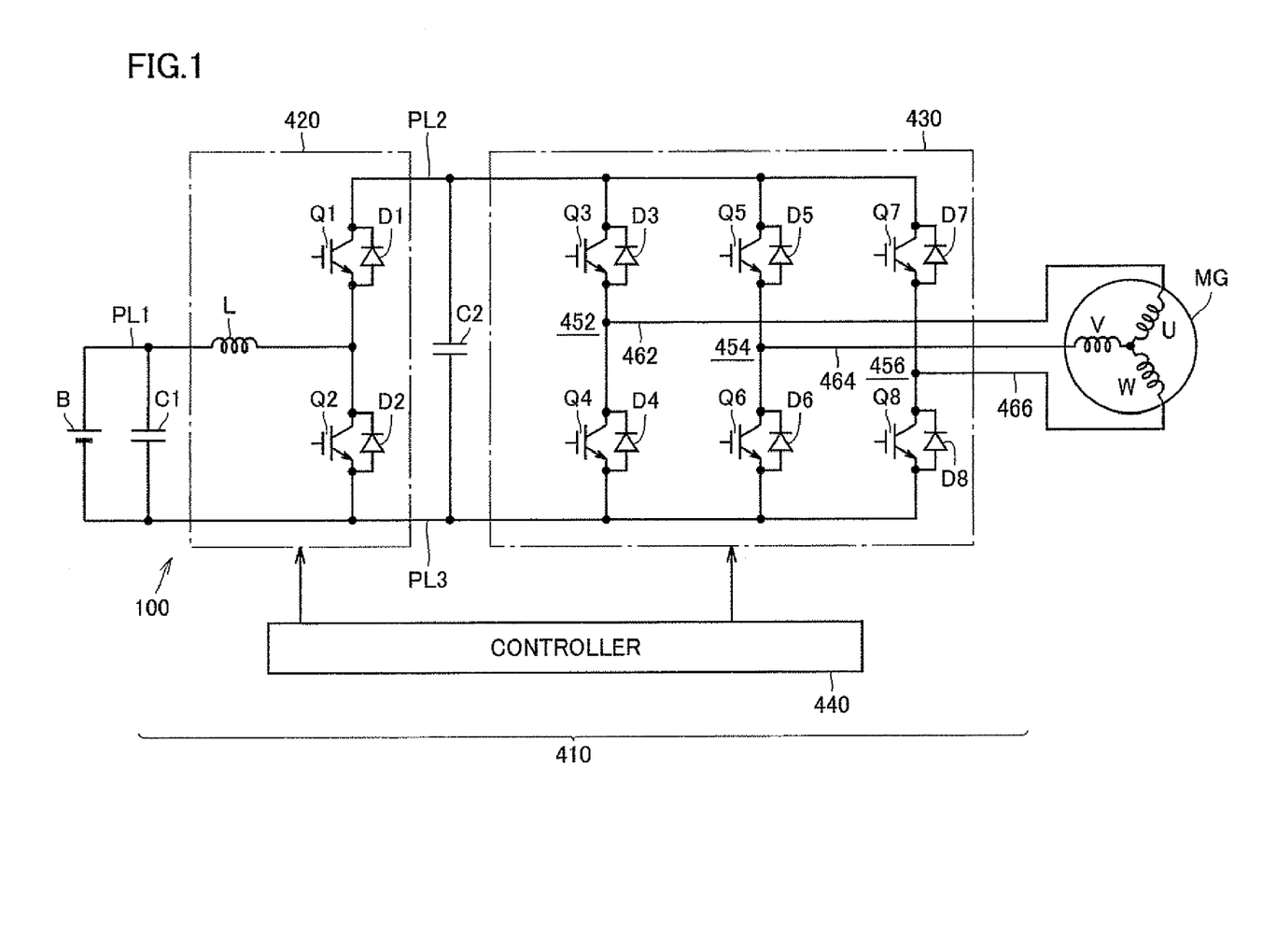
FIG. 1 is an electrical circuit diagram illustrating principal constitutive elements provided in a load drive apparatus equipped with a capacitor device according to the present invention.

FIG. 1 is an electrical circuit diagram illustrating principal constitutive elements provided in a load drive apparatus equipped with a capacitor device according to the present invention.

Referring to FIG. 1, a load drive apparatus 410 is provided with a converter 420, an inverter 430, a controller 440, capacitors C1 and C2, power supply lines PL1 to PL3, and output lines 462, 464 and 466. Converter 420 is connected to a battery B via power supply lines PL1 and PL3, and inverter 430 is connected to converter 420 via power supply lines PL2 and PL3. Inverter 430 is connected to a motor generator MG provided as an electrical load by output lines 462, 464 and 466.

Battery B is a direct current power source such as a nickel-hydrogen or lithium-ion secondary battery. Battery B feeds a generated direct current power to converter 420 and is charged with a direct current power received from converter 420.

Motor generator MG is, for example, a 3-phase AC synchronous motor generator for generating a drive force using an alternating current power received from load drive apparatus 410. Motor generator MG is also used as a power generator for generating an alternating current power by utilizing a power generation effect exerted in deceleration (regeneration) and feeding the generated alternating power to load drive apparatus 410.

Converter 420 includes upper and lower arms constructed from semiconductor modules, and a reactor L. Upper and lower arms are directly connected to between power supply lines PL2 and PL3. The upper arm connected to power supply line PL2 includes a power transistor Q1 and a diode D1 connected in inverse-parallel to power transistor Q1. The lower arm connected to power supply line PL3 includes a power transistor Q2 and a diode D2 connected in inverse-parallel to power transistor Q2. Reactor L is connected to between power supply line PL1 and a connecting point connecting power transistors Q1 and Q2.

Converter 420 boosts a direct current voltage received from battery B using reactor L and supplies the boosted voltage to power supply line PL2. Converter 420 steps down a direct current voltage received from inverter 430 to charge battery B with the voltage thus obtained.

Inverter 430 includes a U-phase arm 452, a V-phase arm 454 and a W-phase arm 456. U-phase arm 452, V-phase arm 454 and W-phase arm 456 are respectively connected in parallel to between power supply lines PL2 and PL3, and upper and lower arms constructed from semiconductor modules constitute these arms. The upper and lower arms of the respective phase arms are directly connected to between power supply lines PL2 and PL3.

A power transistor Q3 and a diode D3 connected in reverse-parallel to power transistor Q3 constitute an upper arm of U-phase arm 452. A power transistor Q4 and a diode D4 connected in reverse-parallel to power transistor Q4 constitute a lower arm of U-phase arm 452. A power transistor Q5 and a diode D5 connected in reverse-parallel to power transistor Q5 constitute an upper arm of V-phase arm 454. A power transistor Q6 and a diode D6 connected in reverse-parallel to power transistor Q6 constitute a lower arm of V-phase arm 454. A power transistor Q7 and a diode D7 connected in reverse-parallel to power transistor Q7 constitute an upper arm of W-phase arm 456. A power transistor Q8 and a diode D8 connected in reverse-parallel to power transistor Q8 constitute a lower arm of W-phase arm 456. Connection points of the respective power transistors in the phase arms are connected to the side of anti-neutral points of coils respectively having the corresponding phases in motor generator MG via the corresponding output lines.

Inverter 430 coverts a direct current voltage received from power supply line PL2 into an alternating current voltage based on a control signal transmitted from controller 440 and outputs the converted alternating current voltage to motor generator MG. Inverter 430 rectifies an alternating current voltage generated by motor generator MG into a direct current voltage and feeds the rectified direct current voltage to power supply line PL2.

Capacitor C1 is connected to between power supply lines PL1 and PL3, thereby smoothening a voltage level of power supply line PL1. Capacitor C2 is connected to between power supply lines PL2 and PL3, thereby smoothening a voltage level of power supply line PL2.

Controller 440 calculates a torque reference value of motor generator MG and respective phase current values, and also calculates respective coil voltages of motor generator MG based on an input voltage of inverter 430. Then, controller 440 generates PWM (Pulse Width Modulation) signals for turning on/off power transistors Q3 to Q8 based on a calculation result thereby obtained and outputs the generated signals to inverter 430. The respective phase current values of motor generator MG are detected by current sensors mounted in the semiconductor modules constituting arms of inverter 430. The current sensor is provided in the semiconductor module to improve a S/N ratio. Controller 440 calculates duty ratios of power transistors Q1 and Q2 to optimize the input voltage of inverter 430 based on the torque reference value mentioned earlier and number of rotations of the motor, and generates PWM signals for turning on/off power transistors Q1 and Q2 based on a calculation result thereby obtained, and then, outputs the generated PWN signals to converter 420.

Controller 440 further controls switching operations of power transistors Q1 to Q8 in converter 420 and inverter 430 so that the alternating current power generated by motor generator MG is converted into a direct current power and battery B is charged with the voltage thus obtained.

In load drive apparatus 410, converter 420 boosts the direct current voltage receive from battery B based on the control signal from controller 440 and supplies the boosted voltage to power supply line PL2. Inverter 430 receives the direct current voltage smoothened by capacitor C2 from power supply line PL2 and converts the received direct current voltage into an alternating current voltage, and then outputs the converted alternating current voltage to motor generator MG.

Inverter 430 converts an alternating current voltage generated by a regenerative operation of motor generator MG into a direct current voltage and outputs the converted direct current voltage to power supply line PL2. Inverter 420 receives the direct current voltage smoothened by capacitor C2 from power supply line PL2 and steps down the received direct current voltage to charge battery B with the voltage thus obtained.

A capacitor device 100 includes capacitors C1 and C2, wherein capacitors C1 and C2 are housed in an identical case. A positive electrode (P electrode) of capacitor. C1 is connected to power supply line PL1, and a negative electrode (N electrode) thereof is connected to power supply line PL3. A positive electrode (P electrode) of capacitor C2 is connected to power supply line PL2, and a negative electrode (N electrode) capacitor C2 is connected to power supply line PL3.

Figure 2:
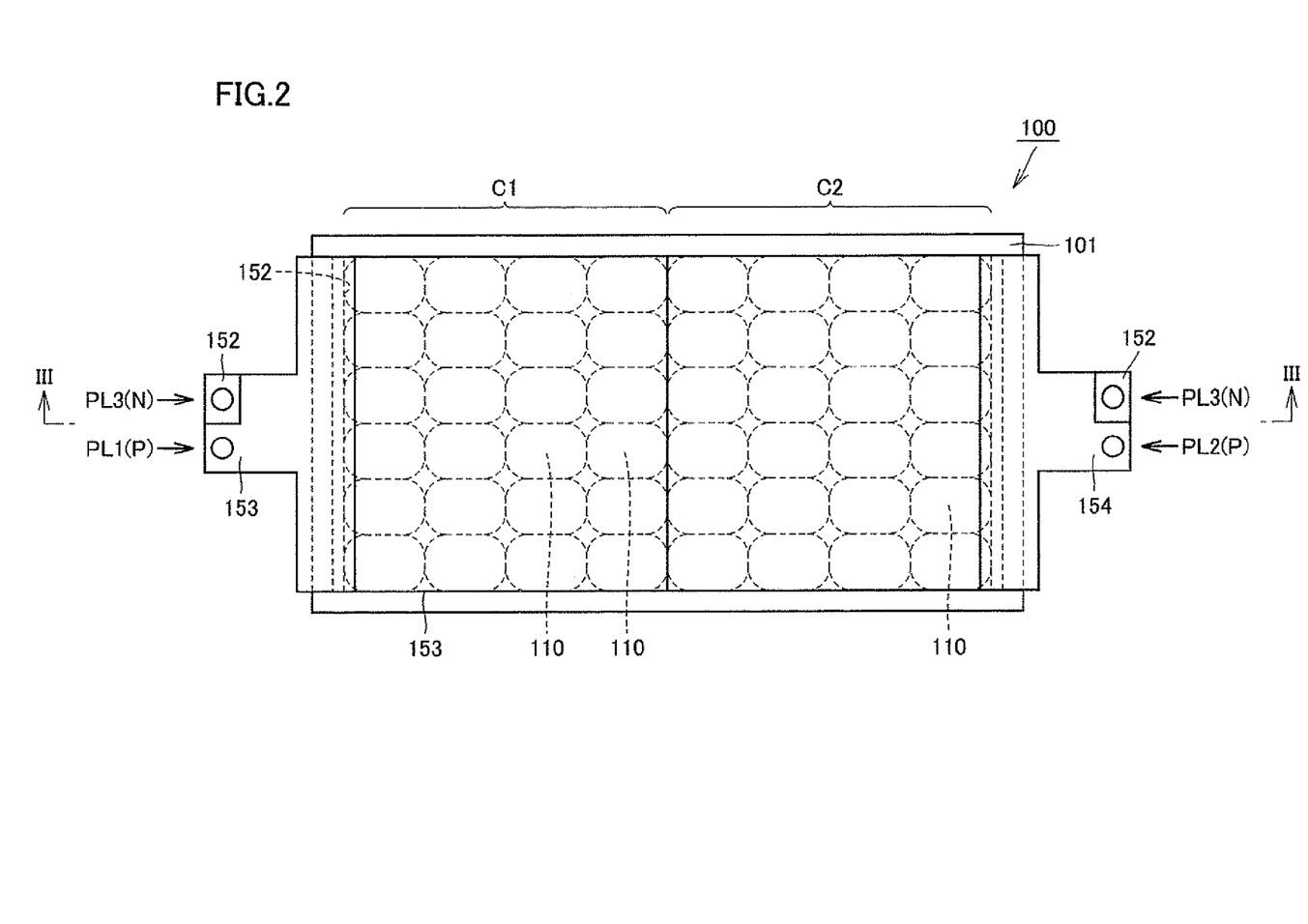
FIG. 2 is a planar view of the capacitor device illustrated in FIG. 1.

FIG. 2 is a planar view of the capacitor device illustrated in FIG. 1. Referring to FIG. 2, capacitor device 100 is provided with an outer housing case 101 where a plurality of capacitors can be housed, and a plurality of capacitors 110 housed in outer housing case 101.

Capacitor 110 is a capacitor where a polyethylene terephthalate (PET) film, a polyethylene naphthalate (PEN) film, or a polypropylene (PP) film is used.

FIG. 2 illustrates outer housing case 101 having a rectangular shape. Outer housing case 101, however, does not necessarily have the shape and may have a circular shape or a polygonal shape.

Outer housing case 101 houses capacitors C1 and C2 therein with a center region of outer housing case 101 as a boundary area therebetween. An equal number of capacitors constitute capacitors C1 and C2, respectively, however, it is not necessary that they both should include the same number of capacitors. One of capacitors C1 and C2 may include more capacitors than the other.

In the present preferred embodiment, the boundary area between capacitors C1 and C2 extends in a shorter-side direction of outer housing case 101. However, the boundary between capacitors C1 and C2 may extend in a longer-side direction of outer housing case 101.

Capacitors 110 have a flattened columnar shape and placed so as to contact with one another. Capacitor 110 is a capacitor having a structure where an insulation film is inserted into between electrodes so that charges are stored between a positive electrode and a negative electrode between the inserted insulation films. A dielectric constant of the capacitor changes depending on a material of the insulation film, and a capacitance thereof accordingly changes. Further, a heat resistance of the capacitor changes depending on the material used for the insulation film.

Outer housing case 101 is provided with an N electrode bus bar 152, a first P electrode bus bar 153 and a second P electrode bus bar 154. N electrode bus bar 152 is connected to power supply line PL3 to be connected to N electrode terminals of capacitors 110. N electrode bus bar 152 is electrically connected to power supply line PL3, N electrode bus bar 152 has a flat-plate shape and works as an electrically conductive member. First P electrode bus bar 153 and second P electrode bus bar 154 are respectively disposed on N electrode bus bar 152. First P electrode bus bar 153 is disposed on the side of capacitor C1, while second P electrode bus bar 154 is disposed on the side of capacitor C2.

Figure 3:
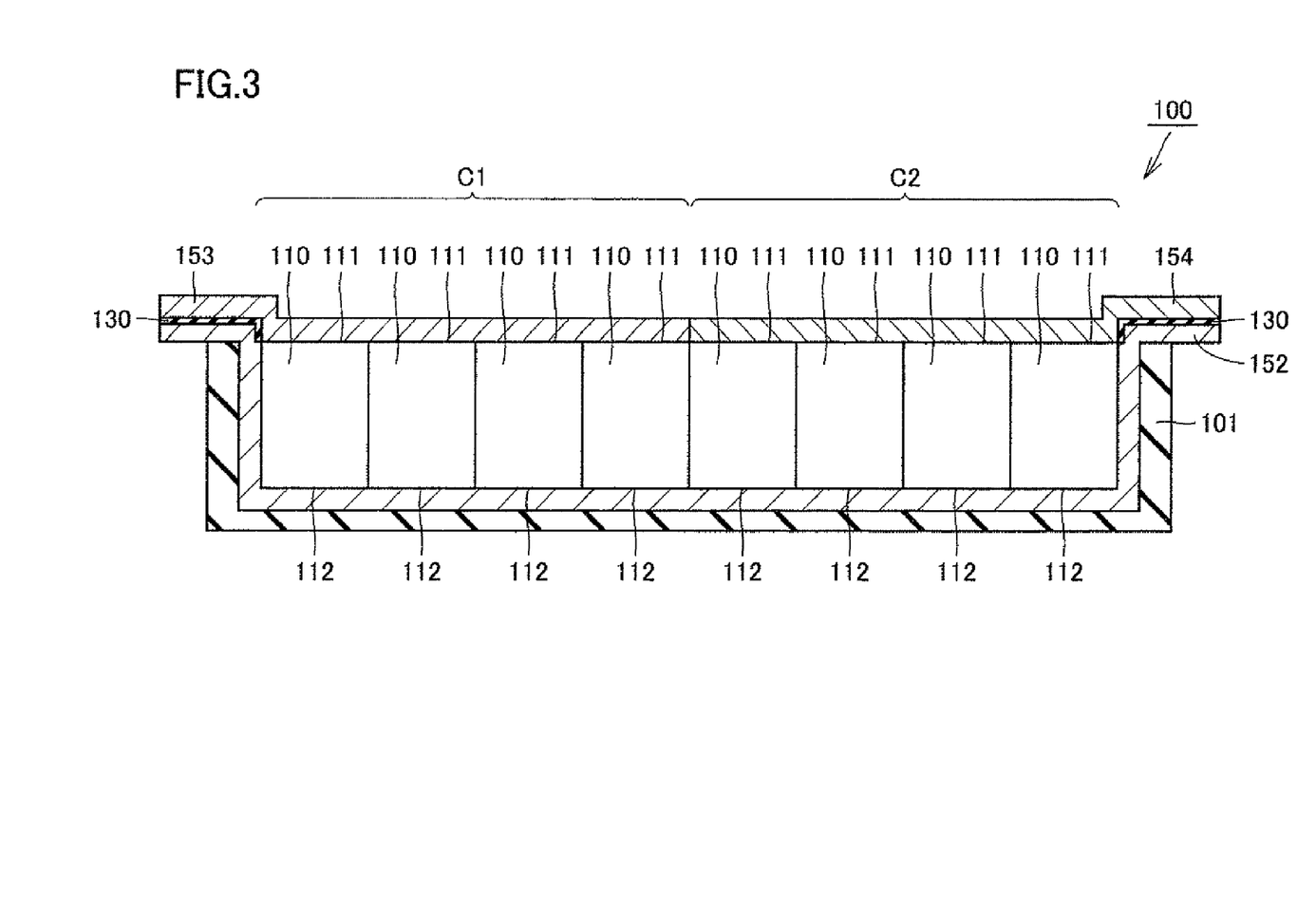
FIG. 3 is a sectional view cut along line illustrated in FIG. 2.

FIG. 3 is a sectional view cut along line illustrated in FIG. 2. Referring to FIG. 3, capacitor device 100 is provided with an outer housing case 101 having a dented shape, an N electrode bus bar 152 formed on a bottom surface of outer housing case 101, a capacitor 110 disposed on N electrode bus bar 152, and a first P electrode bus bar 153 and a second P electrode bus bar 154 in contact with upper surfaces of capacitors 110. N electrode bus bar 152 is connected to N electrodes of all of the capacitors and has such a shape that follows an inner surface of outer housing case 101. An upper surface of capacitor 110 constitutes P electrode terminals 111, and a lower surface thereof constitutes N electrode terminals 112. All of N electrode terminals 112 are connected to N electrode bus bar 152. Capacitors 110 are housed in outer housing case 101 in an orderly manner. P electrode terminals 111 of the upper surface of capacitors 110 are in contact with first P electrode bus bar 153 and second P electrode bus bar 154. In the sectional view illustrated in FIG. 3, all of capacitors 110 have an equal height, however, it is not necessary that capacitors 110 should have an equal longitudinal dimension. Capacitors 110 are formed in an equal size, however, the capacitors to be provided may be variously different in size.

Figure 4:
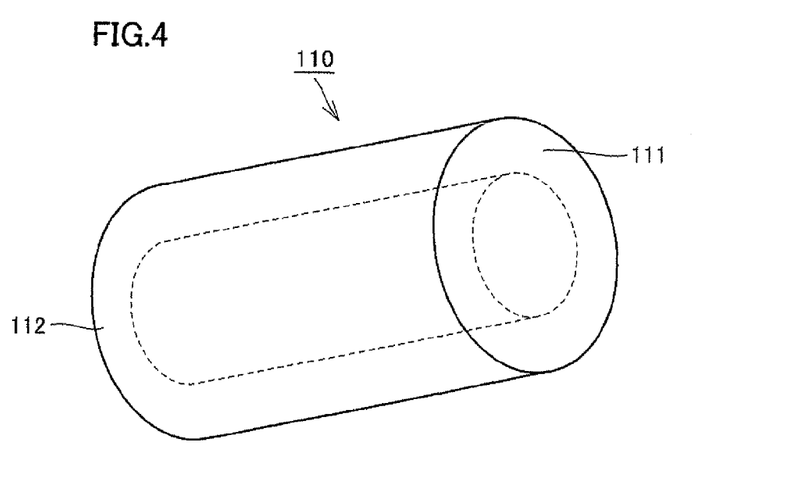
FIG. 4 is a perspective view of a capacitor.

FIG. 4 is a perspective view of the capacitor. Referring to FIG. 4, the capacitor is formed in a columnar shape, wherein P electrode terminal 111 is provided on an axial end surface, and N electrode terminal 112 is provided on another axial end surface. The shape of capacitor 110 is not necessarily limited to the columnar shape. Capacitor 110 may be formed in the shape of prism or elliptical cylinder, or may be formed in the shape of hexagonal cylinder, square prism or triangular prism to be tightly spaced.

Figure 5:
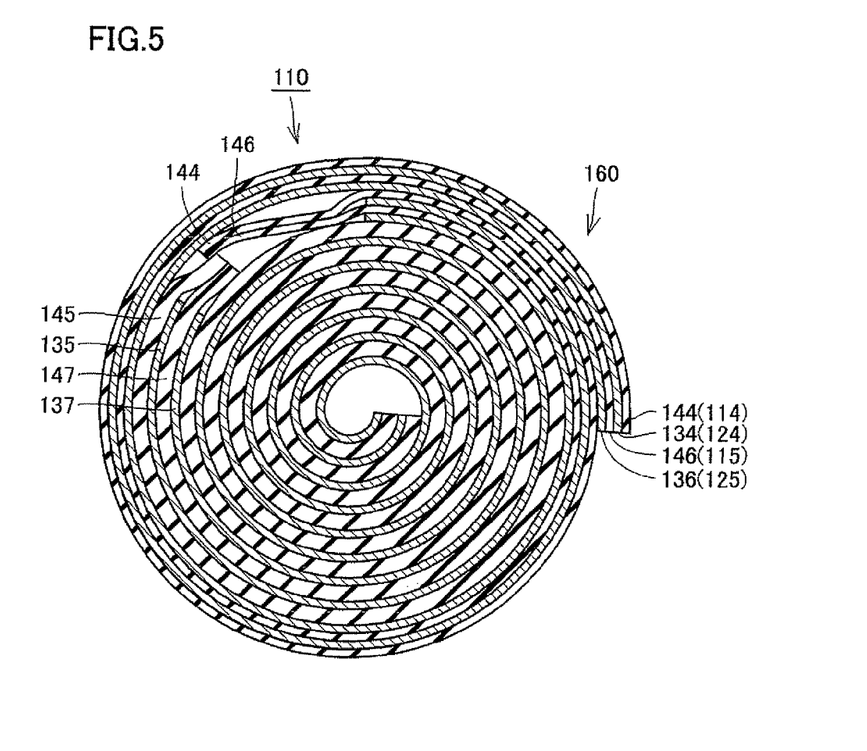
FIG. 5 is a sectional view of the capacitor illustrated in FIG. 4.

FIG. 5 is a sectional view of capacitor 110 illustrated in FIG. 4. As illustrated in FIG. 5, capacitor 110 is formed by winding a multilayer film 160 where an insulation film 114, a cathode electrode 124, an insulation film 115 and an anode electrode 125 are serially multilayered.

In capacitor 110 according to the preferred embodiment 1, cathode electrode 124 is deposited on an upper surface of insulation film 114, insulation film 115 is formed on an upper-surface side of cathode electrode 124, and anode electrode 125 is deposited on an upper surface of insulation film 115.

Insulation film 114 is formed so that a thickness thereof on an inward side of capacitor 110 is larger than a thickness thereof on an outward side of capacitor 110. Insulation film 115 is formed so that a thickness thereof on the inward side of capacitor 110 is larger than a thickness thereof on the outward side of capacitor 110.

When capacitor 110 is driven, an inside temperature of capacitor 110 on the inward side thereof is increased, finally exceeding an inside temperature of capacitor 110 on an outer-surface side thereof. As described earlier, insulation films 114 and 115 are formed to be thicker on the inward side of capacitor 110. The thickness difference can consequently avoid the occurrence of different lengths of lifetime in terms of pressure resistance (insulation) in insulation film 114 and insulation film 115 on the inward and outward sides of capacitor 110.

Figure 6:
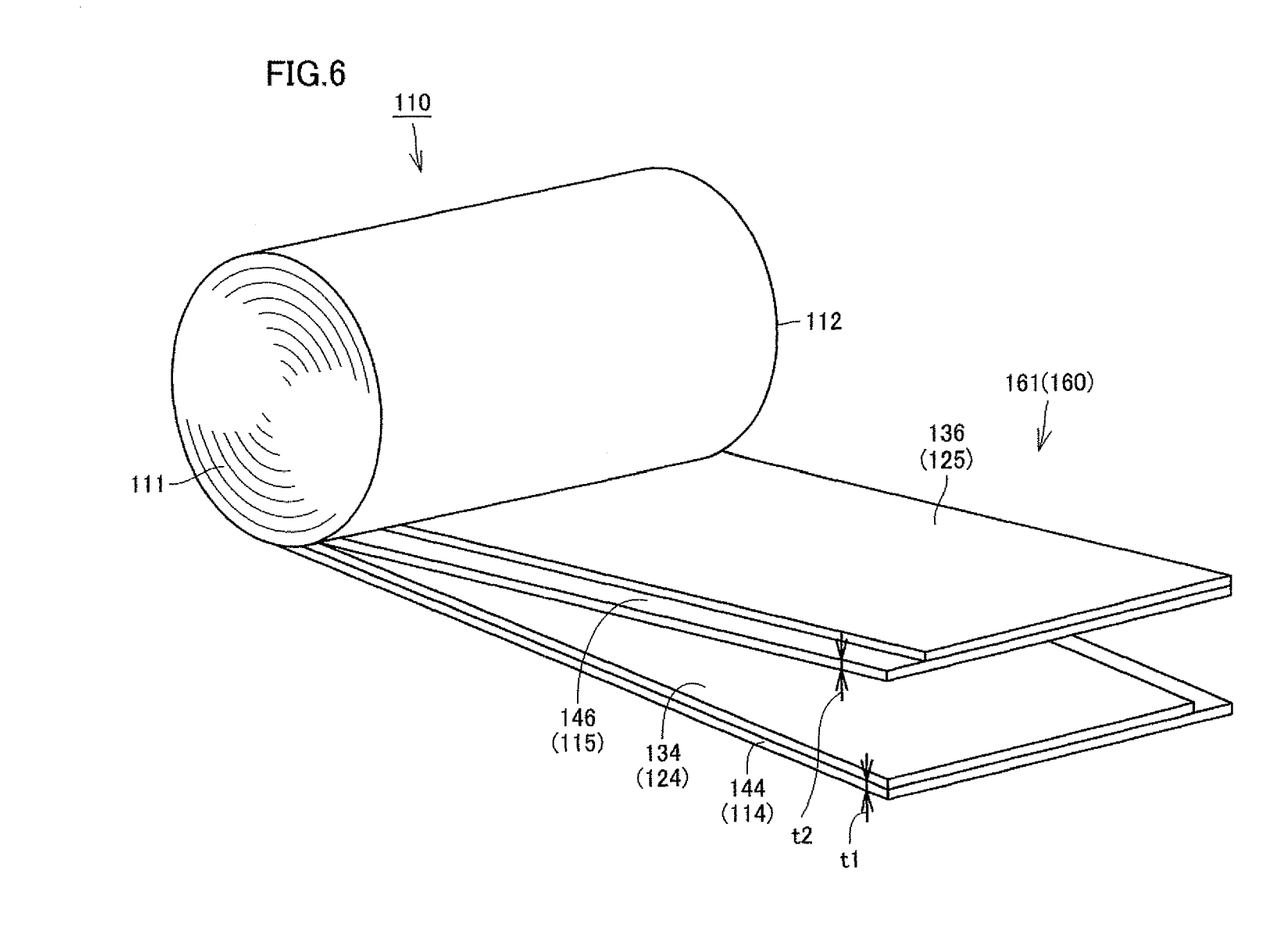
FIG. 6 is a perspective view of a part of a multilayer film disposed on an outward side of the capacitor.
Figure 7:
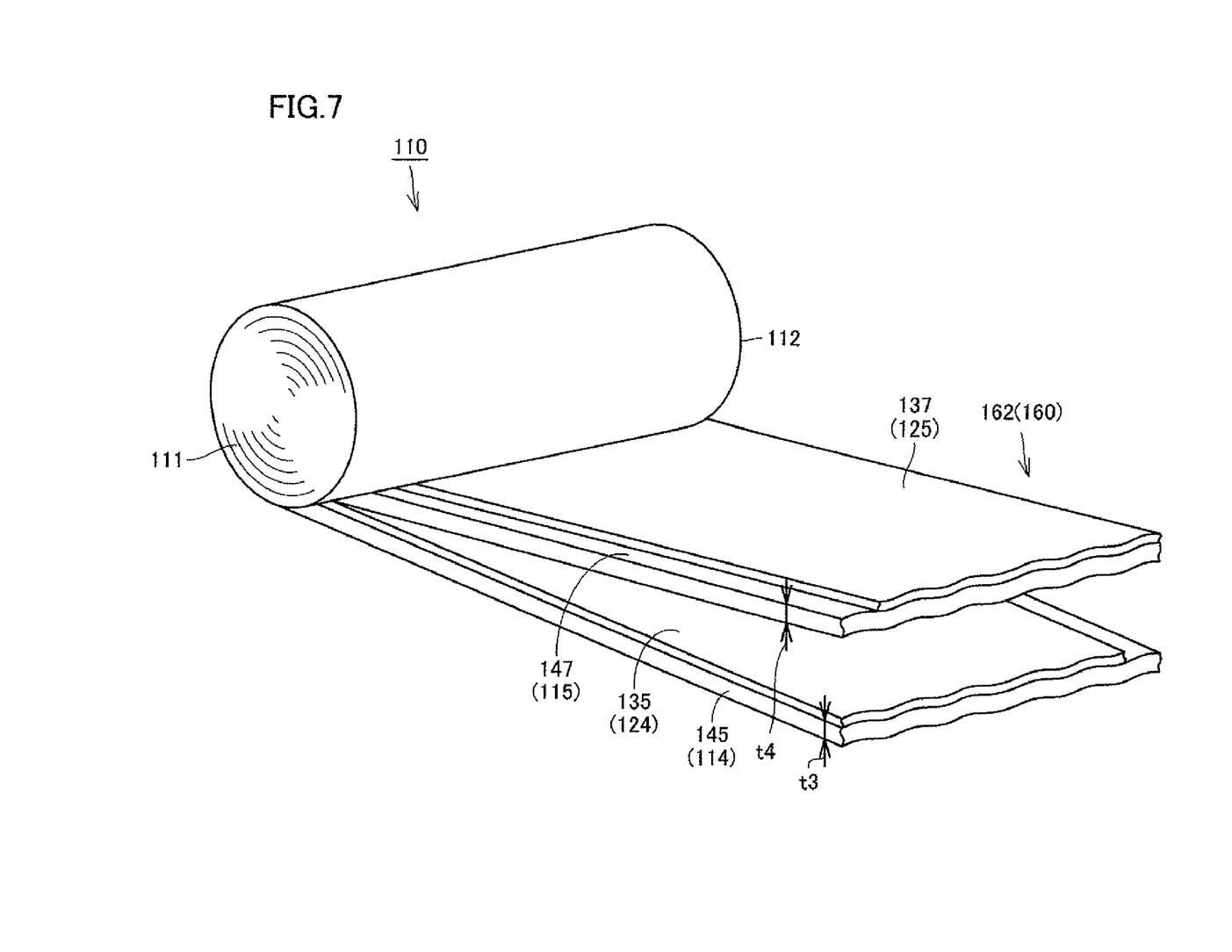
FIG. 7 is a perspective view of a part of a multilayer film disposed on an inward side of the capacitor.

FIG. 6 is a perspective view of a part of multilayer film 160 on the outward side of capacitor 110, FIG. 7 is a perspective view of a part of multilayer film 160 on the inward side of capacitor 110.

As illustrated in FIGS. 6 and 7, multilayer film 160 includes a split multilayer film 161 on the outward side of capacitor 110, and a split multilayer film 162 disposed more inward in capacitor 110 than split multilayer film 161.

Split multilayer film 161 includes a split insulation film 144, a split cathode electrode 134 deposited on an upper surface of split insulation film 144, a split insulation film 146 formed on an upper surface of split cathode electrode 134, and a split anode electrode 136 formed on an upper surface of split insulation film 146.

Split multilayer film 162 includes a split insulation film 145, a split cathode electrode 135 deposited on an upper surface of split insulation film 145, a split insulation film 147 formed on an upper surface of split cathode electrode 135, and a split anode electrode 137 deposited on an upper surface of split insulation film 147

Insulation film 114 includes a split insulation film 144 and a split insulation film 145 disposed more inward in capacitor 110 than split insulation film 144 and having a thickness larger than that of split insulation film 144. Insulation film 115 includes a split insulation film 146 and a split insulation film 147 disposed more inward in capacitor 110 than split insulation film 146 and having a thickness larger than that of split insulation film 146.

Cathode electrode 124 includes a split cathode electrode 134 and a split cathode electrode 135, Anode electrode 125 includes a split anode electrode 136 and a split anode electrode 137.

In split multilayer film 161, a thickness t1 of split insulation film 144 and a thickness t2 of split insulation film 146 are substantially equal to each other, and a thickness t3 of split insulation film 145 of and a thickness t4 of split insulation film 147 are substantially equal to each other, and thicknesses t3 and t4 are larger than thicknesses t1 and t2.

In other words, the thicknesses of split insulation films 145 and 147 in split multilayer film 162 are larger than the thicknesses of split insulation films 144 and 146 in split multilayer film 161. Accordingly, split multilayer film 162 can have a longer duration of life in terms of heat resistance than split multilayer film 161. Further, split multilayer film 162 is provided on the inward side of capacitor 110 so as to prevent the occurrence of different lengths of lifetime on the inward side and outward side of capacitor 110 in the case where the inside temperature of capacitor 110 in higher on the inward side than the outward side thereof.

Split insulation film 144, split insulation film 145, split insulation film 146 and split insulation film 147 are all made of, for example, polyethylene terephthalate (PET), polyethylene naphthalate (PEN) or polypropylene (PP), and the same material is used in all of these films. Thicknesses t1 and t2 of split insulation films 144 and 146 are, for example, about a few μm, and thicknesses t3 and t4 of split insulation films 145 and 147 are, for example, about several tens of μm.

Split cathode electrode 134, split cathode electrode 135, split anode electrode 136 and split anode electrode 137 are made of metal such as aluminum.

Figure 8:
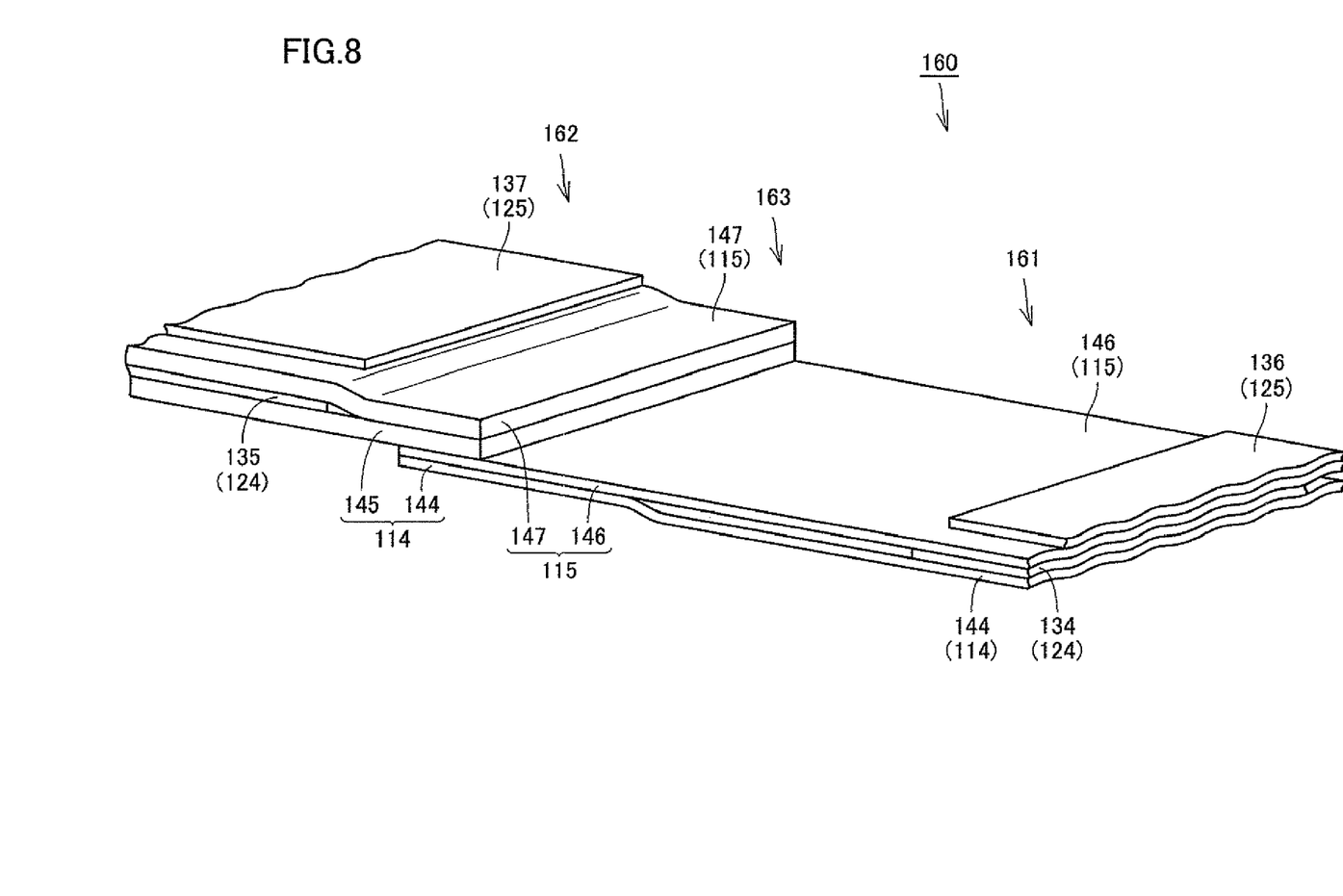
FIG. 8 is a perspective view of a joint where a split multilayer film and another split multilayer film are joined with each other.

FIG. 8 is a perspective view of a joint 163 where split multilayer film 161 and split multilayer film 162 are joined with each other. As illustrated in FIG. 8, in multilayer film 160, an end portion of split multilayer film 162 on the outward side of capacitor 110 and an end portion of split multilayer film 161 on the inward side of capacitor 110 are joined with each other at joint 163. At join 163, split insulation film 144, split insulation film 146, split insulation film 145 and split insulation film 147 are serially provided from the outward side of capacitor 110 in a radial direction. In the example illustrated in FIG. 8, the upper surface of split insulation film 146 and a lower surface of split insulation film 145 are bonded to each other by, for example, an adhesive, or welded to each other.

An end portion of split cathode electrode 135 on the side of junction 163 (outward side of capacitor 110) is disposed more inward in capacitor 110 than an end portion of split insulation film 145 on the side of junction 163 (outward side of capacitor 110). An end portion of split anode electrode 137 on the side of junction 163 (outward side of capacitor 110) is disposed more inward in capacitor 110 than an end portion of split insulation film 147 on the side of junction 163 (outward side of capacitor 110).

An end portion of split cathode electrode 134 on the side of junction 163 (inward side of capacitor 110) is disposed more outward in capacitor 110 than an end of split insulation film 144 on the side of junction 163. An end portion of split anode electrode 136 on the side of junction 163 (inward side of capacitor 110) is disposed more outward in capacitor 110 than an end portion of split insulation film 146 on the side of junction 163 (inward side of capacitor 110).

Because the end portion of split cathode electrode 135 on the outer peripheral side of capacitor 110 and an end portion of split anode electrode 136 on the inward side of capacitor 110 are distant from each other, split cathode electrode 135 and split anode electrode 136 can be prevented from contacting each other when multilayer film 160 is wound. Further, at least a predetermined creeping distance can be ensured between split cathode electrode 135 and split anode electrode 136 so as to control the occurrence of possible short circuit between split cathode electrode 135 and split anode electrode 136.

Embodiment 2

Figure 9:
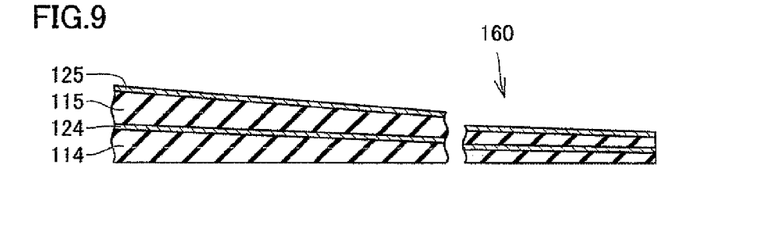
FIG. 9 is a sectional view of a multilayer film constituting a capacitor according to a preferred embodiment of the present invention.
Figure 10:
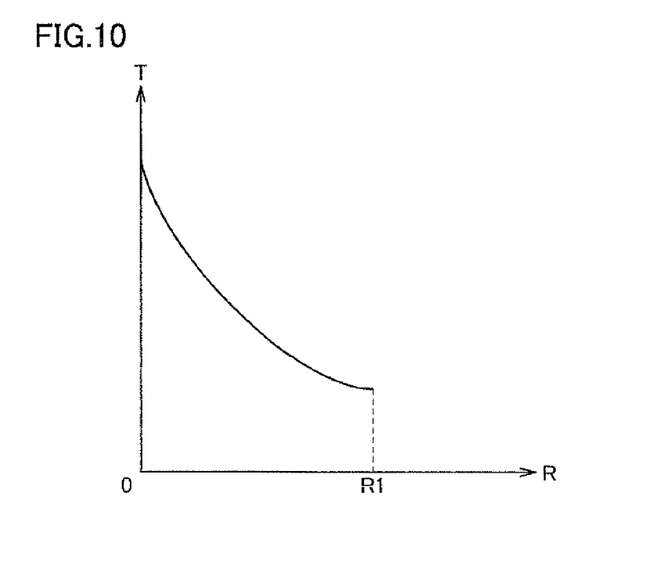
FIG. 10 is a graph showing an inside temperature of the capacitor.
Figure 11:
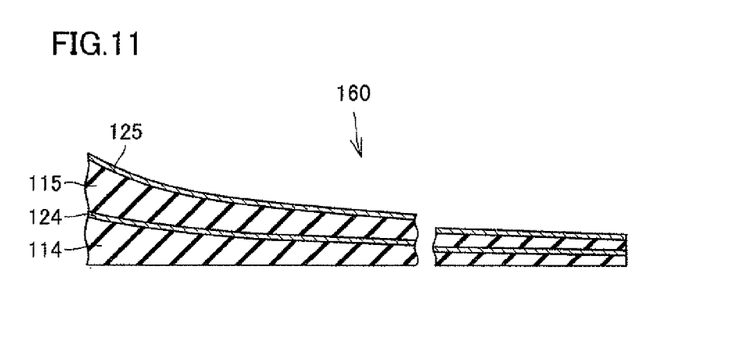
FIG. 11 is a sectional view illustrating a modified embodiment of a multilayer film constituting a capacitor according to a preferred embodiment 2 of the present invention.

Referring to FIGS. 9 and 11, a capacitor 110 according to a preferred embodiment 2 of the present invention is described below. Any constitutive elements illustrated in FIGS. 9 to 11 identical or corresponding to those of FIGS. 1-8 may be simply given the same reference symbols to avoid redundant description.

FIG. 9 is a sectional view of a multilayer film 160 constituting capacitor 110 according to the present preferred embodiment. As illustrated in FIG. 9, thicknesses of insulation film 114 and insulation film 115 in multilayer film 160 are increased from the outward side of capacitor 110 toward the inward side thereof.

When capacitor 110 is driven and the inside temperature of capacitor 110 on the inward side thereof is thereby increased to finally exceed the inside temperature of capacitor 110 on the outward side thereof, the thicknesses thus constructed can avoid the occurrence of different lengths of lifetime in terms of heat resistance in insulation film 114 and insulation film 115 on the inward and outward sides of capacitor 110. As a result, early deterioration of a part of capacitor 110 as compared with the other parts thereof can be prevented from happening. Another advantage is that a single insulation film can constitute each of insulation film 114 and insulation film 115, resulting in reduction of manufacturing costs.

FIG. 10 is a graph showing the inside temperature of capacitor 110. In FIG. 10, a lateral axis denotes a radial distance R starting from a center axis of capacitor 110, and a longitudinal axis denotes a temperature T. It is known from the illustration of FIG. 10 that the inside temperature of capacitor 110 shows a sharp increase from the outer periphery (R=R1) of capacitor 110 toward the center (R=0) of capacitor 110. Such an abrupt temperature increase shortens the lifetime of the insulation films constituting insulation films 114 and 115 in terms of pressure resistance.

FIG. 11 is a sectional view illustrating a modified embodiment of multilayer film 160 constituting capacitor 110 according to the preferred embodiment 2.

As illustrated in FIG. 11, a rate of increase of a thickness in multilayer film 160 from the inward side of capacitor 110 toward more inward side of capacitor 110 is larger than a rate of increase of a thickness in multilayer film 160 from the outer peripheral side of capacitor 110 toward the inner peripheral side thereof.

When capacitor 110 is driven and the inside temperature of capacitor 110 is thereby increased, the thicknesses thus constructed can avoid the occurrence of different lengths of lifetime on the inward and outward sides of capacitor 110. Insulation film 114 and insulation film 115 are formed in a small thickness at edges thereof on the outer peripheral side of capacitor 110, for example, about a few μm. Thus, capacitor 110 can be formed in a compact size. In the preferred embodiment 2, insulation film 114 and insulation film 115 are both formed so that the end portions thereof on the inside of capacitor 110 are thicker than the end portions thereof on the outward side of capacitor 110, however, the thicknesses are not necessarily limited thereto. At least one of insulation film 114 and insulation film 115 may be formed so that the end portion thereof on the inward side of capacitor 110 is thicker than the end portion thereof on the outward side of capacitor 110. Accordingly, at least the insulation film having the inner-side thickness larger than the outer-side thickness can have an improved pressure resistance lifetime, and deterioration of the film can be thereby controlled.

Embodiment 3

Figure 12:
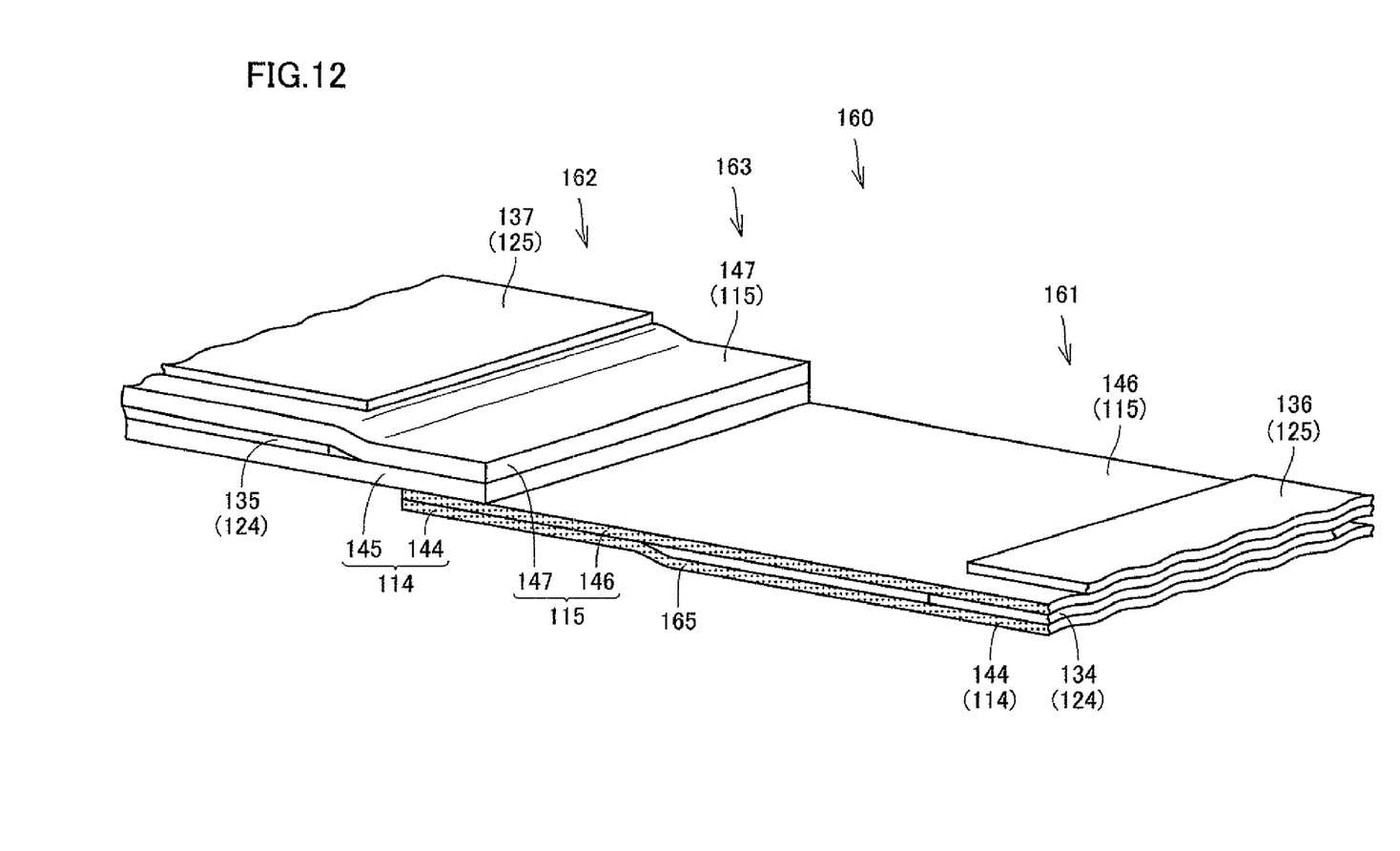
FIG. 12 is a perspective view of a multilayer film constituting a capacitor according to a preferred embodiment 3 of the present invention.
Figure 13:
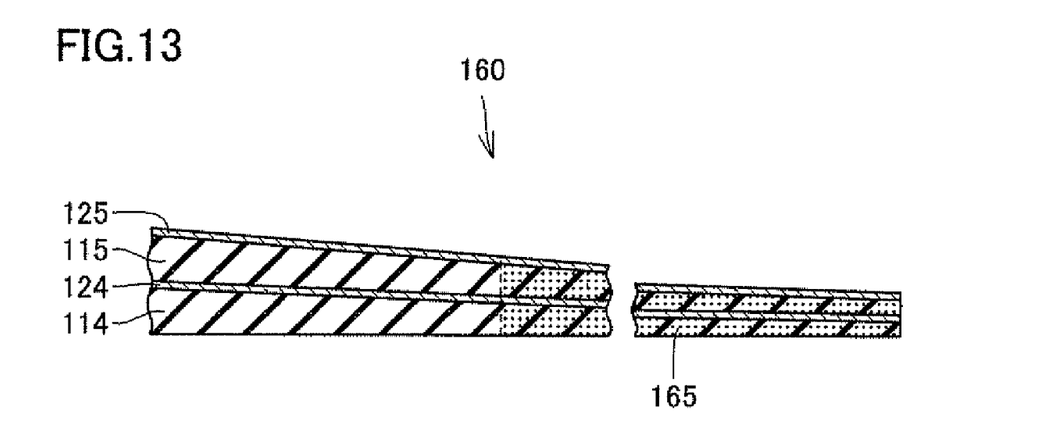
FIG. 13 is a sectional view illustrating a modified embodiment of the multilayer film constituting the capacitor according to the preferred embodiment 3.

Referring to FIGS. 12 and 13, a preferred embodiment 3 of the present invention is described below. Any constitutive elements identical or corresponding to those of FIGS. 1 to 11 are simply shown with the same reference symbols to avoid redundant description.

FIG. 12 is a perspective view of a multilayer film 160 of a capacitor 110 according to the preferred embodiment 3. As illustrated in FIG. 12, a high-dielectric powder (high-dielectric member) 165, such as ceramics, is blended into split insulation film 144 and split insulation film 146.

The incorporation of high-dielectric powder 165 can improve dielectric constants of insulation film 114 and insulation film 115, leading to reduction of capacitor 110 in its dimensions.

In capacitor 110, split insulation film 144 and split insulation film 146 disposed on the outer peripheral side of capacitor 110 each has a curvature radius larger than those of split insulation film 145 and split insulation film 147. Therefore, split insulation film 144 and split insulation film 146 mixed with high-dielectric powder 165 can be similarly wound well, and such an unfavorable matter as cracks is unlikely to occur in split insulation film 144 and split insulation film 146.

In split insulation film 144 and split insulation film 146 mixed with high-dielectric powder 165, dielectric loss is lessened as compared with split insulation film 144 and split insulation film 146 not including high-dielectric powder 165. As a result, split insulation film 144 and split insulation film 146 per se are unlikely to generate heat. As a result, the incorporation of high-dielectric powder 165 can control temperature increases in split insulation film 144 and split insulation film 146, thereby improving the pressure resistance lifetime in split insulation film 144 and split insulation film 146.

FIG. 13 is a sectional view illustrating a modified embodiment of multilayer film 160 constituting capacitor 110 according to the preferred embodiment 3.

As illustrated in FIG. 13, high-dielectric powder 165 may be incorporated in the case where insulation film 114 and insulation film 115 are formed to be thicker from the outward side of capacitor 110 toward the inward side thereof. In the example illustrated in FIG. 13, high-dielectric powder 165 is mixed into insulation film 114 and insulation film 115 selectively from their center parts through parts on the outward side of capacitor 110.

The present invention was so far described referring to the preferred embodiments. The embodiments disclosed in this specification, however, are merely the illustration of examples in all aspects and should not restrict the present invention by any means. The scope of the present invention is based on not the description of embodiments but the appended scope of claims, and it is intended to cover all of such modifications as fall within the scope of the appended claims and the meaning and scope of equivalent. Any specific numeral values and ranges recited so far are just a few examples, and applicable numeral values and ranges are not necessarily limited thereto.

INDUSTRIAL APPLICABILITY

The present invention is suitably applied to a capacitor.

The invention claimed is:

1. A capacitor formed by winding a multilayer film in which a first insulation film, a first electrode, a second insulation film and a second electrode are serially multilayered, wherein
   at least one of said first insulation film and said second insulation film is formed so that an end portion thereof on an inward side of said capacitor has a thickness larger than a thickness of an end portion thereof on an outward side of said capacitor, and
   said first electrode and said second electrode are formed as far as said inward-side end portion formed to be thicker.

2. The capacitor according to claim 1, wherein
   a material having a dielectric constant higher than dielectric constants of said first and second insulation films is added to the end portion of said first insulation film on the outward side of said capacitor and the end portion of the said second insulation film on the outward side of said capacitor.

3. A capacitor formed by winding a multilayer film in which a first insulation film, a first electrode, a second insulation film and a second electrode are serially multilayered, wherein
   at least one of said first insulation film and said second insulation film is formed so that an end portion thereof on an inward side of said capacitor has a thickness larger than a thickness of an end portion thereof on an outward side of said capacitor,
   said first insulation film is formed so that an end portion thereof on the inward side of said capacitor has a thickness larger than a thickness of an end portion thereof on the outward side of said capacitor, and
   said second insulation film is formed so that an end portion thereof on the inward side of said capacitor has a thickness larger than a thickness of an end portion thereof on the outward side of said capacitor.

4. The capacitor according to claim 3, wherein
   said first insulation film is formed so as to have a thickness progressively larger from the end portion of said first insulation film on the outward side of said capacitor toward the end portion thereof on the inward side of said capacitor, and
   said second insulation film is formed so as to have a thickness progressively larger from the end portion of said second insulation film on the outward side of said capacitor toward the end portion thereof on the inward side of said capacitor.

5. The capacitor according to claim 4, wherein
   said first insulation film includes a first split insulation film disposed on the outward side of said capacitor, and a second split insulation film disposed more inward in said capacitor than said first split insulation film and formed to be thicker than said first split insulation film, and
   said second insulation film includes a third split insulation film disposed on the outward side of said capacitor, and a fourth split insulation film disposed more inward in said capacitor than said third split insulation film and formed to be thicker than said third split insulation film.

6. The capacitor according to claim 5, wherein
   said first electrode includes a first split electrode formed on said first split insulation film, an end portion of said first split electrode on the inward side of said capacitor being disposed more outward in said capacitor than an end portion of said first split insulation film on the inward side of said capacitor, and
   a second split electrode formed on said second split insulation film, an end portion of said second split electrode on the outward side of said capacitor being disposed more inward in said capacitor than an end portion of said second split insulation film on the outward side of said capacitor, and
   said second electrode includes a third split electrode formed on said third split insulation film, an end portion of said third split electrode on the inward side of said capacitor being disposed more outward in said capacitor than an end portion of said third split insulation film on the inward side of said capacitor, and a fourth split electrode formed on said fourth split insulation film, an end portion of said fourth split electrode on the outward side of said capacitor being disposed more inward in said capacitor than an end portion of said fourth split insulation film on the outward side of said capacitor.

* * * * *